Figure 1:
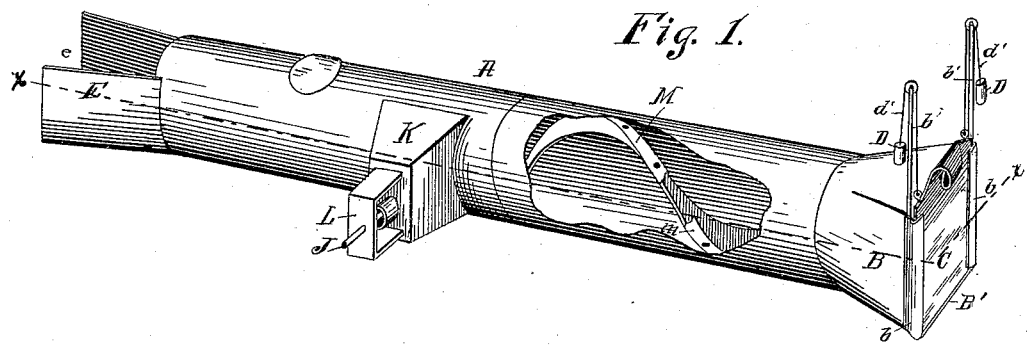

(No Model.)

A. GUSTLIN.
WATER POWER.

No. 383,291. Patented May 22, 1888.

Witnesses.
M. A. Barnes,
Van Buren Hillyard,

Inventor:
Aham Gustlin.
By R. S. & A. P. Lacey
Attys.

N. PETERS, Photo-Lithographer, Washington, D. C.

UNITED STATES PATENT OFFICE.

ABRAM GUSTLIN, OF BOONE, IOWA.

WATER-POWER.

SPECIFICATION forming part of Letters Patent No. 383,291, dated May 22, 1888.

Application filed November 16, 1887. Serial No. 255,346. (No model.)

*To all whom it may concern:*

Be it known that I, ABRAM GUSTLIN, a citizen of the United States, residing at Boone, in the county of Boone and State of Iowa, have invented certain new and useful Improvements in Water-Powers; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to devices for utilizing the power of natural forces, chiefly flowing water. The object of the invention is to produce a simple and compact device which will utilize the maximum percentage of such forces. The conduit—designed to be placed in the ground or below the surface of the water, and having a flaring mouth at one end and a counterbalanced cut-off or gate at the other end, to control the amount of water passing through the conduit or to shut it off entirely—has the water-wheel located therein and a spiral guide arranged on each side of the wheel, the one guide being in front of, and the other guide in the rear of, the wheel. The wheel is mounted on a crank-shaft journaled longitudinally within the conduit, and motion is transmitted from the crank-shaft to suitable mechanism by a rod which extends through the side of the conduit and through suitable guides fastened to an extension projecting from the side of the tube.

The improvement consists in the novel construction and peculiar arrangement of parts, which will be more fully hereinafter set forth, claimed, and shown in the drawings, in which—

Figure 2:
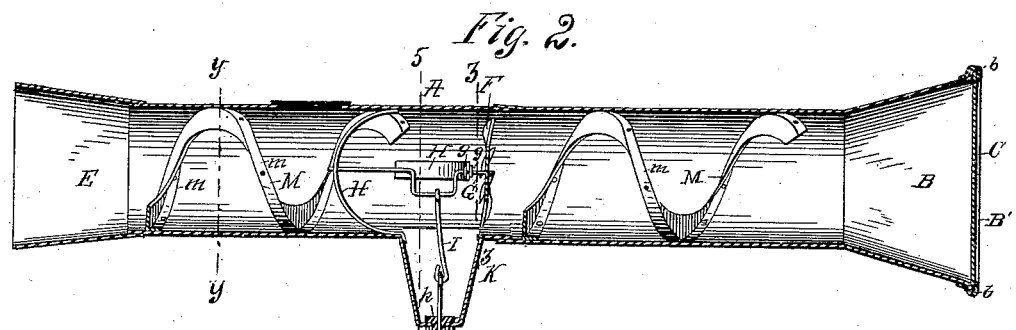
Figure 3:
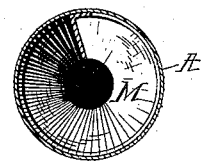
Figure 4:
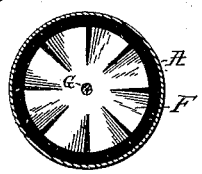
Figure 5:
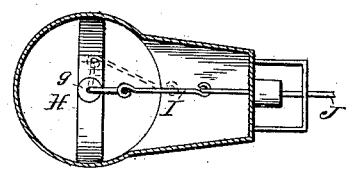

Figure 1 is a perspective view, parts being broken away, of a device of my invention; Fig. 2, a horizontal section about on the line *x x* of Fig. 1; Fig. 3, a cross-section on the line Y Y of Fig. 2; Fig. 4, a cross-section on the line Z Z of Fig. 2, and Fig. 5 a cross-section on the line 5 5 of Fig. 2.

The conduit A, of desired length and composed of one or more sections, is made of any material usually employed in the construction of conduits or pipes, metal being preferable owing to its durability and capability of withstanding hard usage. The ends of the conduit flare outwardly, and the end B, having vertical guides $b$ and standards $b'$, is provided with the cut-off or gate C, which is counterbalanced by the weights D, attached to the cords $d'$ on the standards $b'$. The lower side, B′, of the end B is extended to project across the path of the gate C and limit its downward movement. The end E has its upper side removed, forming the opening $e$, into which the water pours when falling from an elevation, as when the device is applied for utilizing the force of water dashing over rocks, as falls.

The water-wheel F, located at a convenient point in the pipe or conduit, is keyed to the crank-shaft G, which is journaled within the pipe horizontally in bearings in the cross bars H. The collars $g\ g$, embracing the cross-bar H and fastened to the crank-shaft, prevent any longitudinal movement of the said crank-shaft in its bearings. Motion is transmitted from the crank-shaft to any suitable machinery by the pitman I and rod J, which has bearings in the dome K and bracket L, extending from the dome. The packing box $k$ forms a tight joint between the dome and rod and prevents the escape of water.

The spiral guides M—one in front of and the other in the rear of wheel F—give a whirling motion to the water before it reaches the wheel and after it has passed beyond the wheel, so as to cause the force of the water to be expended on the wheel near its periphery, where it will perform the most work, and not strike the center of the wheel and produce unnecessary friction against its solid portion. The spiral guide has a flange, $m$, which rests against and is bolted to the interior of the pipe.

Having thus described my invention, what I claim, and desire to secure by Letters Patent, is—

The combination, with the pipe or conduit having flaring ends, one side of one end being removed and a gate for closing the other end, and a wheel journaled within the pipe on a crank-shaft arranged parallel with the bore of the pipe, of the dome, the bracket, the rod having bearings in the dome and bracket, and the pitman connecting the crank shaft and rod, substantially as described.

In testimony whereof I affix my signature in presence of two witnesses.

ABRAM GUSTLIN.

Witnesses:
 FRANK WILLIAMS,
 W. E. DOUGHERTY.